ns position in the image based on horizontal alignment.

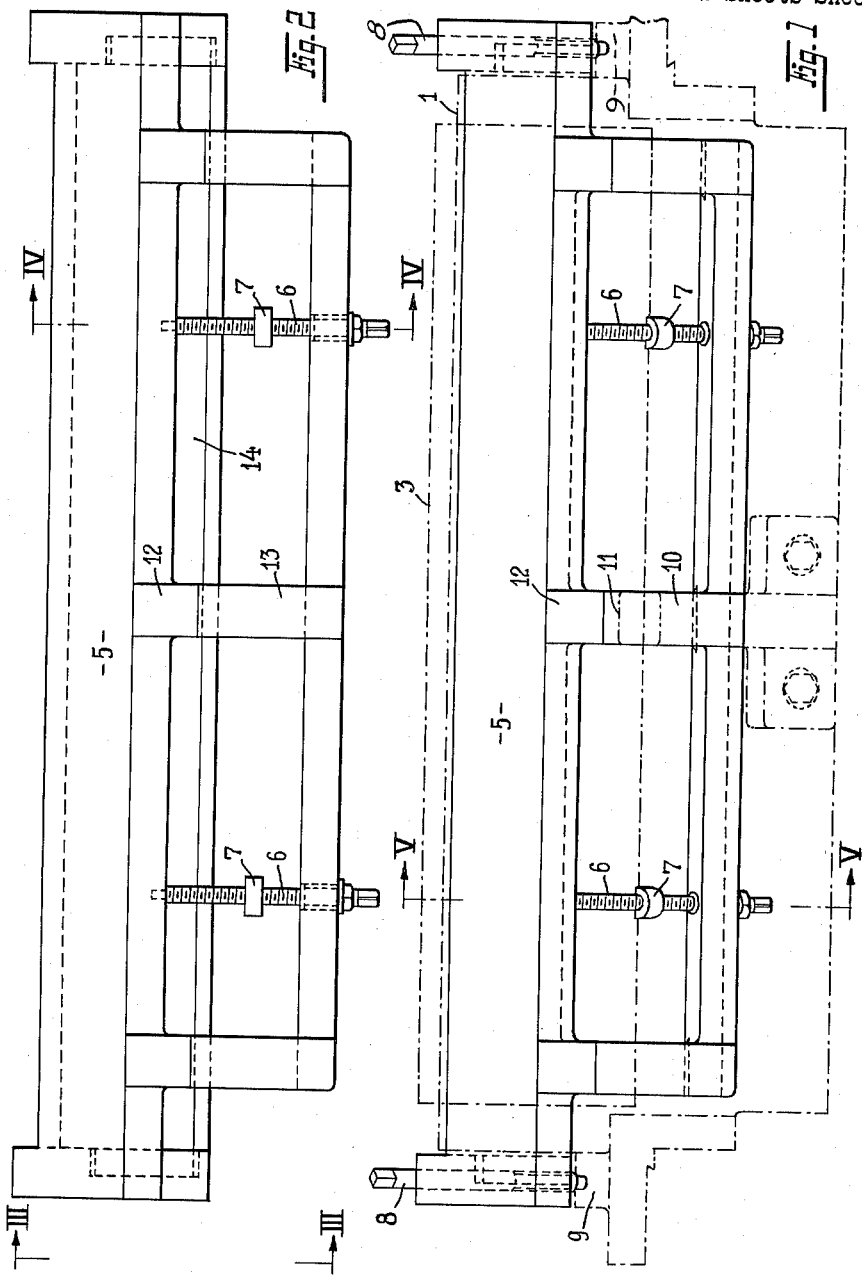

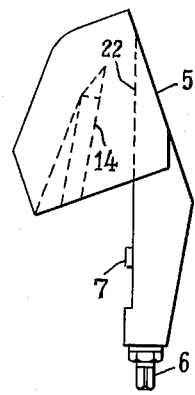
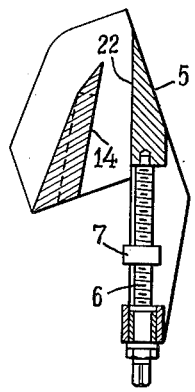
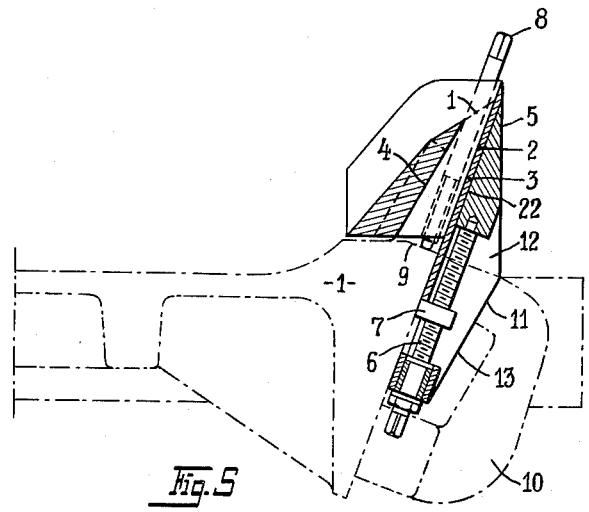

United States Patent Office 3,204,673
Patented Sept. 7, 1965

3,204,673
DEVICE IN VENEER PEELING MACHINES
Knut Hjalmar Nordin, Ostra Storgatan 85b,
Jonkoping, Sweden
Filed Apr. 30, 1962, Ser. No. 191,105
Claims priority, application Sweden, May 2, 1961,
4,561/61
5 Claims. (Cl. 144—212)

This invention relates to veneer peeling machines and one object is to obtain a device in these machines to hold the knife-blade solely by wedging it tight without use of clamping bolts. This renders slots through the knife-blade unnecessary for clamping and the blade may be made very thin. Furthermore, the device will allow a more rapid change of the knife-blade.

The invention is explained in the following description, reference being had to the accompanying drawings, in which:

FIG. 1 is a plane view of a knife-blade holding device belonging to a veneer peeling machine;

FIG. 2 is a plane view of a clamp by means of which the knife-blade can be pressed tight;

FIG. 3 is an end view of the clamp;

FIG. 4 is a section along the line IV—IV of FIG. 2; and

FIG. 5 is a section along the line V—V of FIG. 1.

The knife-blade holding device as shown consists of a wedge plate 1, drawn with dot and dash lines and provided with a surface 2, against which the knife-blade 3 is to be placed. The wedge plate is provided with an opposite directed surface 4, forming an angle to said plane surface 2, and the knife-blade is pressed tight against the surface 2 by a clamp 5, which has inner surfaces 22 and 14 complementary to surfaces 2 and 4 sloping toward each other at an angle corresponding to the angle between the surfaces 2 and 4, which is placed over the wedge plate and the knife-blade and moved downwards or allowed to fall down from its own weight to the position as shown in FIG. 5.

In the clamp a pair of screw-bolts 6 are rotatably journalled parallel to the surface 22 and extend through a nut 7, which by contact with the surface 2 of the wedge plate, is prevented from turning with the screw-bolts. The knife-blade rests against said nuts at its bottom edge opposite the cutting edge, and the position of the knife-blade may then be adjusted by turning said screw-bolts, so that the nuts will be moved along the screw-bolts.

Screw-bolts 8 are threaded into an end of the clamp 5, so that they may be pressed against upturned surface portions 9 of the wedge plate 1. When removing the knife-blade for substitution or resharpening, one may loosen it simply by screwing the screw-bolts 8 aginst the surface portions 9, and the clamp will be lifted some millimeters so it is freed from its wedging position. After removal of the knife-blade the screw-bolts are adjusted again, the new knife-blade is moved to its proper place and the clamp is let down, whereupon the knife-blade will be wedged tight.

When using a long knife-blade and accordingly a long clamp, the clamp may be supported between its ends. In the example shown, the clamp is supported by a bracket 10 in its middle. Bracket 10 has a surface 11, parallel to the surface 4, which presses against a ledge 12 in the clamp, said ledge being provided with an external surface 13 with a corresponding slope.

The invention is not limited to the embodiment as described and shown in the drawing and it may be further modified within the scope of the invention.

What I claim is:

1. A holding means for the knife-blade in a veneer peeling machine having a frame, comprising an elongated upstanding wedge-plate mounted on said frame having a supporting surface for the knife-blade and an opposite directed surface forming an angle to the supporting surface, an elongated movable clamp having inner surfaces forming an angle corresponding to the angle of said wedge-plate surfaces to embrace the knife-blade and said wedge-plate, said blade being pressed against said wedge-plate by wedging action of the clamp moving by its weight over the wedge-plate and knife-blade.

2. The holding means as claimed in claim 1, including lifting means for lifting the clamp above the position in which it squeezes the knife-blade tight.

3. The holding means as claimed in claim 1, in which screw-bolts are provided at the ends of the clamp to cooperate with the wedge-plate for lifting the clamp above the position in which it squeezes the knife-blade tight.

4. The holding means as claimed in claim 1, including adjustment means for vertical adjustment of the knife-blade.

5. The holding means as claimed in claim 1, including screw-bolts rotatably journalled in the clamp parallel to the supporting surface for said blade, and nuts on said screw-bolts operating as supports for the knife-blade and supporting the edge of said knife-blade opposite to the cutting edge of the knife-blade.

References Cited by the Examiner
UNITED STATES PATENTS
667,715   2/01   Kraus _____ 144—212
FOREIGN PATENTS
487,923   11/52   Canada.

WILLIAM W. DYER, JR., *Primary Examiner.*
DONALD R. SCHRAN, *Examiner.*